United States Patent [19]

Abbema et al.

[11] Patent Number: 5,547,228

[45] Date of Patent: Aug. 20, 1996

[54] CYLINDRICAL CORROSION BARRIER FOR PIPE CONNECTIONS

[76] Inventors: Wiliam D. Abbema, Rte. 3 Box 3344, Pearland, Tex. 77581; John K. Lewis, 14006 Blazey Dr., Houston, Tex. 77095

[21] Appl. No.: 221,834

[22] Filed: Apr. 1, 1994

[51] Int. Cl.$^6$ .................................................. F16L 13/02
[52] U.S. Cl. ........................ 285/22; 285/55; 285/351; 285/370
[58] Field of Search ........................ 285/55, 21, 22, 285/351, 370

[56] References Cited

U.S. PATENT DOCUMENTS

| | | | |
|---|---|---|---|
| 2,366,579 | 1/1945 | Von Ahrens . | |
| 2,764,426 | 9/1956 | Von Ahrens | 285/22 |
| 2,814,508 | 11/1957 | Seamark . | |
| 2,829,909 | 4/1958 | Magnani | 285/351 X |
| 3,076,261 | 2/1963 | Christensen | 285/22 |
| 3,165,082 | 1/1965 | Boker | 285/22 X |
| 3,508,766 | 4/1970 | Kessler et al. | 285/55 X |
| 3,961,814 | 6/1976 | Byrne et al. | 285/21 |
| 4,257,630 | 3/1981 | Bortell et al. | 285/21 |
| 4,619,470 | 10/1986 | Overath | 285/55 |
| 4,786,089 | 11/1988 | McConnell | 285/370 X |
| 4,811,975 | 3/1989 | Paul et al. | 285/351 |
| 4,913,465 | 4/1990 | Abbema et al. | 285/55 X |
| 5,104,152 | 4/1992 | Galfant | 285/55 X |
| 5,131,694 | 7/1992 | Portis | 285/351 |
| 5,219,187 | 6/1993 | Mikitka . | |
| 5,282,652 | 1/1994 | Werner | 285/55 |
| 5,346,261 | 9/1994 | Abbema . | |

FOREIGN PATENT DOCUMENTS

| | | | |
|---|---|---|---|
| 1293983 | 4/1962 | France | 285/55 |
| 6713372 | 12/1967 | Netherlands | 285/55 |

*Primary Examiner*—Dave W. Arola
*Attorney, Agent, or Firm*—Jeffrey L. Streets

[57] ABSTRACT

A weld connection joining abutted ends of pipe includes a heat limiting sleeve therein which provides a continuous seal to protect the weld and the interior portions of the pipe from the materials passing through the pipe. The sleeve may be configured from a non-metallic material, such as PTFE, and a plurality of seal rings may be located on the outer circumference thereof to seal the sleeve to the interior surface of the pipe. The non-metallic sleeve is inherently non-corrosive, and therefore no secondary protective coatings need be provided on the interior surfaces of the pipe connection to protect the weld. To position the sleeve in the pipe ends, and to properly position the pipe ends for welding, the sleeve includes a plurality of removable spacer pins thereon which are removed from the sleeve before the weld connection is completed.

28 Claims, 2 Drawing Sheets

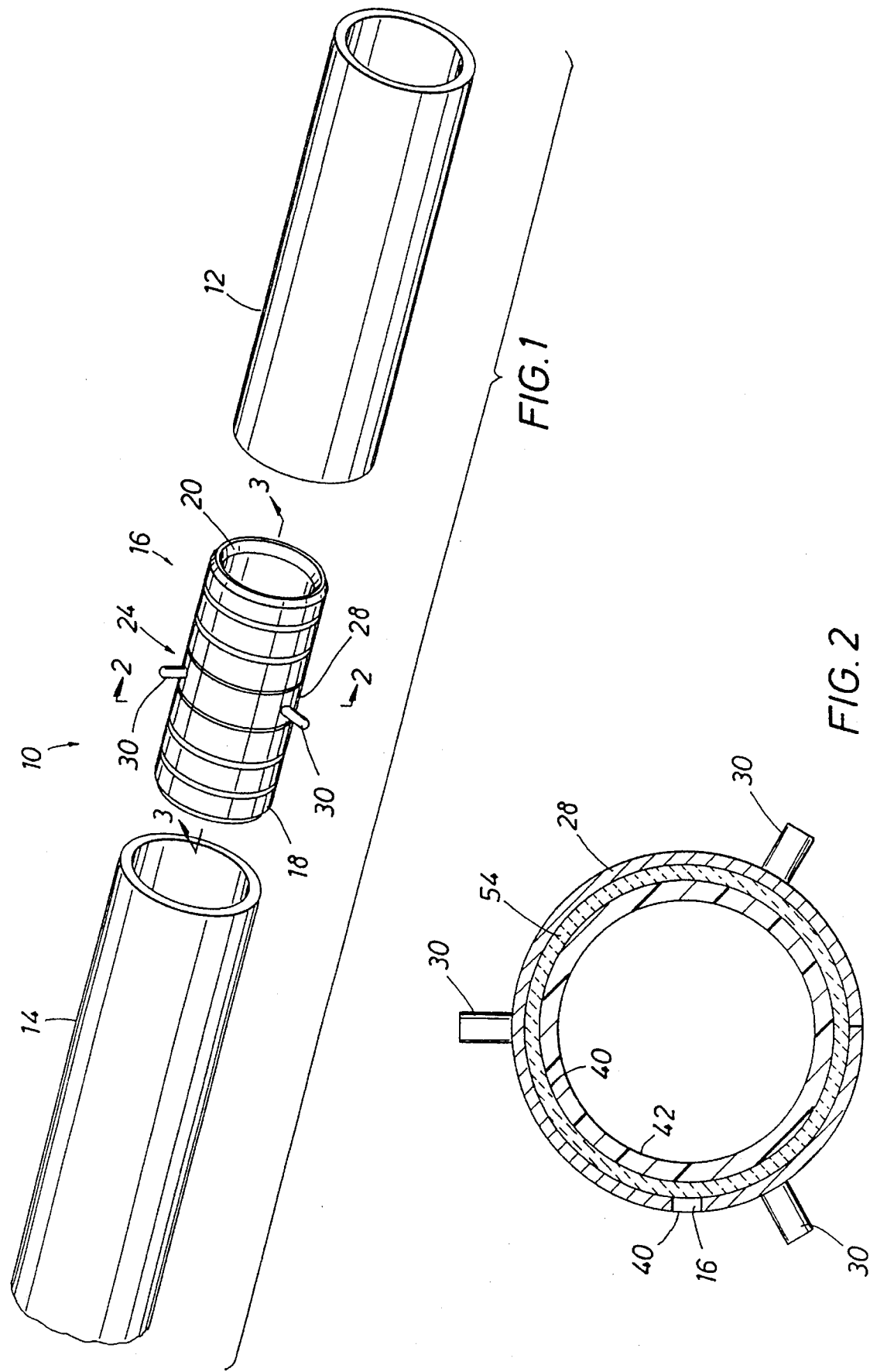

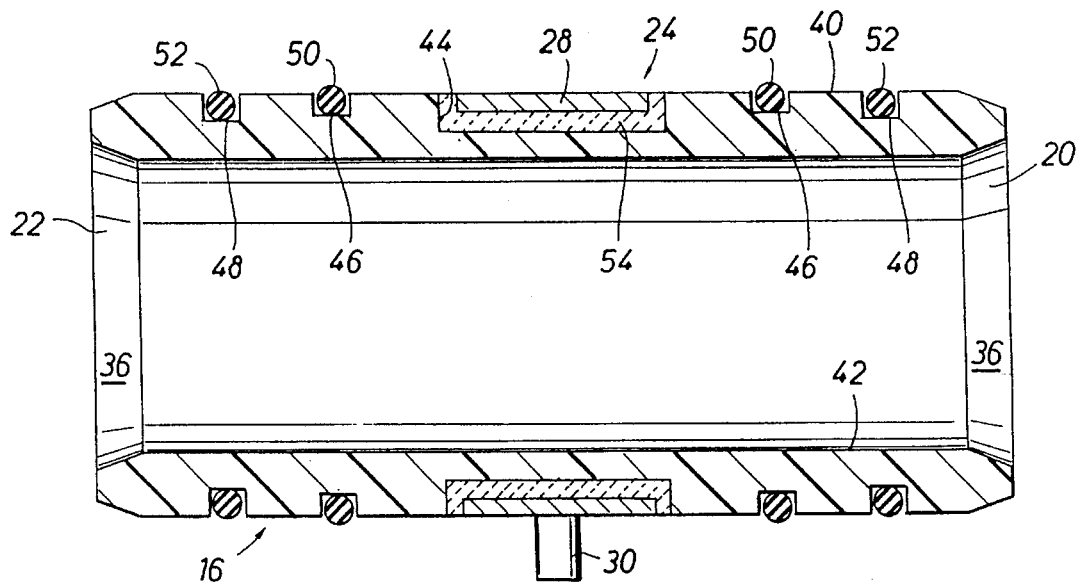
FIG. 3
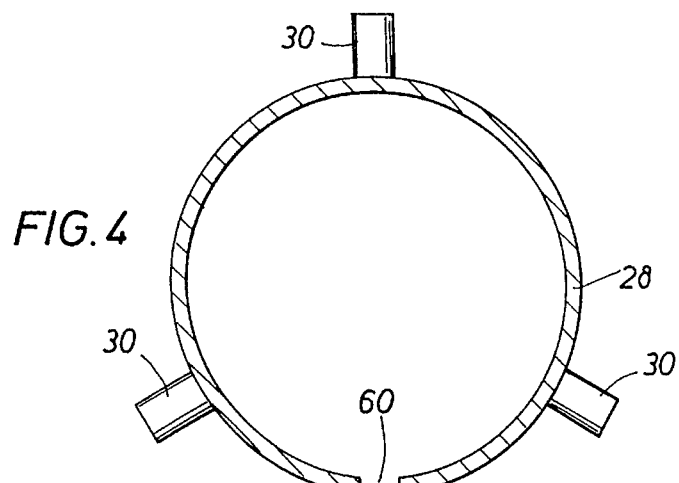
FIG. 4
FIG. 5
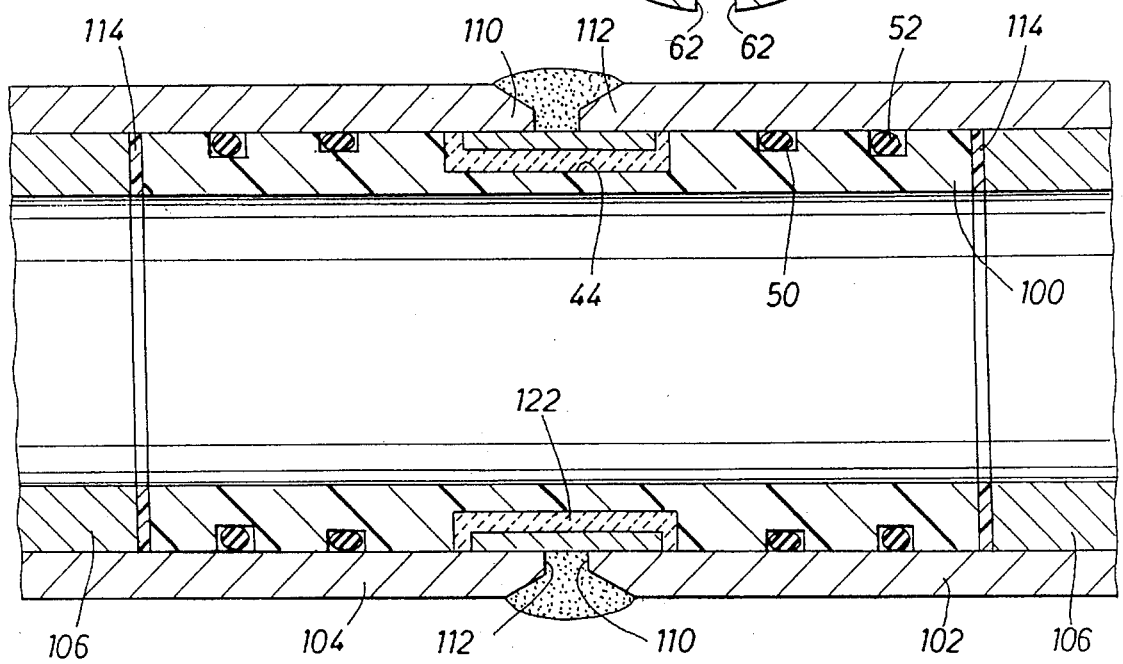

CYLINDRICAL CORROSION BARRIER FOR PIPE CONNECTIONS

BACKGROUND OF THE INVENTION

The present invention relates to the field of pipe connections. More particularly, the present invention relates to the field of welded pipe connection useful in the oil and gas production, refining and transportation industries.

Tubular goods, such as pipe used to transport oil and gas and products thereof, must be capable of withstanding the corrosive and/or erosive attributes of materials passing therethrough without failure. Such pipe is commonly manufactured from alloy steels which have insufficient anti-corrosive and/or anti-erosive properties to withstand attack from the gasses and fluids which are passed therethrough. Therefore, the interior regions of these pipes are commonly coated with protective materials, such as thin polymer based coatings or cement based liners, which form a protective barrier between the pipe material and the materials passing through the pipe.

Pipe used to transport oil, gas, and their products is typically configured in lengths of up to approximately 60 feet, and more typically less than 45 feet. Therefore, to span any substantial distance, these individual lengths of pipe must be connected end to end. The most common method of attaching the individual lengths of pipe is by welding their ends together. Welding of the pipe ends presents several pipe material protection problems. First, where the pipe is protected by a thin polymer coating, the heat generated during welding destroys the coating adjacent the weld joint. This exposes the pipe material to the corrosive and erosive fluids passing through the pipe, which may lead to failure of the pipe. Additionally, the weld itself may be attacked by the gases and fluids passed through the pipe. Therefore, the weld area, and the pipe adjacent the weld, must be supplementally protected from the erosive and/or corrosive pipe environment.

One method of protecting the weld connections from the material flowing through the pipe is to apply a protective coating to the interior of the weld connection after welding. After several pipe lengths have been welded together, a re-coating pig is sent down the pipe to re-coat the weld joint in-situ. This in-situ re-coating is expensive and time consuming, which reduces the efficiency of using this method.

Another method of protecting the area of the pipe adjacent a weld from the materials passing through the pipe employs an intermediate insert which fits into the pipe adjacent a weld joint to form a physical barrier between the weld and the materials passing through the pipe. One such insert is shown in U.S. Pat. No. 5,219,187, Mikitka, wherein the insert is configured as s sleeve provided in a supplemental pipe segment which is welded to one end of a pipe. The insert is integrally provided in the pipe segment, preferably covers the entire inner diameter of the pipe segment, and extends outwardly from the free end of the pipe segment when the pipe segment is welded to the pipe. To connect the length of pipe with the insert projecting therefrom into an adjacent pipe, the sleeve is inserted into the end of the adjacent pipe, and the free end of the pipe segment is welded to the end of the adjacent pipe. When the pipe segment and adjacent pipe end are welded together, a portion of the protective coatings on the interior of the pipe and insert are destroyed by the heat of the weld. Additionally, if the sleeve is damaged at any point, the entire pipe to which it is attached is rendered useless.

Another insert for protecting pipe ends at weld joints is disclosed in U.S. Pat. No. 4,913,465, Abbema. In that reference, a metallic sleeve is placed into the ends of two adjacent pipes prior to welding the adjacent ends of the pipe together. The sleeve includes a circumferential recessed area which aligns under the weld as the weld is formed, and a seal disposed on either side of the recessed area. An insulative wrap and a plurality of heat retaining strips are received in the recessed area. The heat retaining strips span the recessed area, and contact the mass of the metallic sleeve at either end of the strip. Each strip also includes alignment bosses thereon, to which the pipe ends are physically engaged to provide a preselected gap between adjacent pipe ends, and to center the sleeve between the two pipes. The metallic alignment bosses are sacrificed into the weld during welding.

The connection system disclosed in Abbema has several limitations. First, the sleeve is metallic and therefore transfers a substantial amount of heat from the welding operation along the inner diameter of the pipe. This heat can destroy the interior protective coating on the pipe at a substantial distance inwardly of the pipe end. In an attempt to mask the area of the pipe where the protective layer is destroyed, the sleeve is configured as a spanning element, i.e., it spans the burned or otherwise destroyed portion of the interior pipe coating adjacent the pipe ends. However, the sleeve is metallic, and it also is subject to corrosion or erosion when exposed to the pipe fluids or gasses. In an attempt to obviate any corrosion or erosion problem with the sleeve, a secondary protective coating is applied to the inner diameter of the sleeve and to the portion of the outer diameter of the sleeve adjacent the ends of the sleeve before the sleeve is inserted into the pipe ends. Additionally, a mastic is applied to the inner diameter of the pipe. The mastic lubricates the sleeve upon insertion of the sleeve into the pipe end and provides a secondary coating barrier if the coating on the outer diameter of the sleeve is damaged. However, during welding operations, the heat of welding will travel through the heat retaining straps and into the sleeve at discrete spots around the circumference of the sleeve, and this heat will transfer through the sleeve and create localized burned areas of protective coating at the inner diameter of the sleeve. The mastic will also be partially destroyed by heat during welding operations, and the mastic may become disengaged from the sleeve ends and expose any defects in the sleeve coating to the erosive and corrosive pipe environment. Further, the seal configuration on the sleeve does not fully protect the weld area from the erosive and/or corrosive conditions within the pipe. The seal provided on either side of the recess cannot span the possible gaps which may be present as a result of the tolerance on the pipe inner diameter. Therefore, when the pipe inner diameter is at the high end of the acceptable tolerance, the seal may not engage the pipe. Likewise, when the pipe inner diameter is at the low side of the tolerance, the seal may be destroyed as the sleeve is shoved into the pipe end, particularly if the seal is configured for the high end of the inner diameter tolerance. In either case, well fluids may enter the annular area between the sleeve and the pipe. Additionally, the mastic may interfere with the seating of the seals against the inner diameter of the pipe, which will allow pipe fluids and gasses to leach between the sleeve and the pipe. Finally, the bosses used to align the pipe ends and maintain the proper weld gap may, when sacrificially incorporated into the weld, reduce the strength of the weld and thereby reduce the effectiveness of the weld connection.

SUMMARY OF THE INVENTION

The present invention includes a sleeve having multiple embodiments useful for providing a continuous corrosion barrier at a weld connection of adjacent pipe ends. In the first embodiment, the sleeve includes a tubular member having a central recessed portion and a plurality, preferably two, of seal rings disposed adjacent either side of the recessed area. The multiple seals extend different distances from the surface of the sleeve to ensure sealing between the pipe and sleeve throughout the tolerance range of the pipe. The sleeve, in conjunction with the seals, protects the weld joint and adjacent pipe surfaces from erosive and/or corrosive conditions within the pipe.

In a second embodiment, the sleeve includes multiple removable spacers extending therefrom which provide the desired spacing between the pipe ends but which are removable prior to the completion of the weld joint. Thus, in this embodiment, the spacers are not sacrificed into the weld.

In a further embodiment, the sleeve is preferably formed from a non-corrosive material that has a relatively low coefficient of heat transfer. By forming the sleeve from a non-corrosive material, the sleeve itself is resistant to the pipe fluids and gasses which may increase the protection of the pipe and weld afforded by the sleeve.

BRIEF DESCRIPTION OF THE DRAWINGS

These and other advantages of the invention will be apparent from reading the description of the embodiments, when read in conjunction with the following drawings, wherein:

FIG. 1 is an exploded view of the pipe connection of the present invention;

FIG. 2 is a sectional view of the connection of FIG. 1 at section 2—2;

FIG. 3 is a further sectional view of the connection of FIG. 1 at section 3—3;

FIG. 4 is a side view of the alignment ring of the sleeve of the present invention, before assembly onto a sleeve member; and FIG. 5 is a sectional view of an alternative embodiment of the sleeve of FIG. 3.

DESCRIPTION OF THE EMBODIMENTS

Referring to FIG. 1, the continuous corrosion barrier 10 of the present invention generally includes a sleeve 16 which is received in adjacent ends 12, 14 of adjacent lengths of internally coated pipe. The sleeve 16 includes a generally right cylindrical housing 18, having opposed open ends 20, 22, (end 22 shown in FIG. 3), and a central shielding portion 24 which is partially received into the pipe end 12 when one end of the sleeve 16 is fully received into the pipe end 12. The central shielding portion 24 preferably includes a ring member 28, having a plurality, preferably three to six, of alignment spacers 30 circumferentially spaced thereabout and extending outwardly therefrom. The spacers 30 are preferably attached to the ring 28 by tack welding, although other attachment means, such as forming the connection of the spacer 30 to the ring 28 as a rivet, or as a simple mechanical connection capable of being easily broken, may be provided. When the sleeve 16 is properly positioned in the pipe ends 12, 14 the pipe ends 12, 14 contact, or are in close proximity to, the spacers 30. Preferably, the spacers 30 are configured as pins, which extend outwardly from the outer diameter of the pipe, or may be configured as spherical balls.

During a welding operation, particularly a multiple pass welding operation, substantial heat is generated which will increase the temperature of the pipe ends 12, 14 above the burning or transformation temperature of the thin protective coating maintained on the interior surface of the pipe and prior art metallic sleeve. When the areas of the coating on the inside of the pipe and the inside of the prior art internally coated metallic sleeve are destroyed during welding, the underlying pipe material and sleeve material will be exposed to the gases or fluids which are passed through the pipe. This can cause the pipe or the sleeve to fail. Therefore, to properly protect the weld joint, the sleeve 16 must provide a barrier to prevent the materials such as fluids or gases from contacting, and then eroding and/or corroding the exposed areas of the pipe and a non-compromised inner surface to protect the weld and the connection from corrosion and/or erosion from the materials passing through the pipe. The sleeve 16 of the present invention may be configured to meet both requirements. Referring now to FIG. 3, one embodiment of the sleeve 16 of the present invention is shown in detail. In this embodiment, the sleeve 16 is a generally tubular member, having an outer circumferential surface 40 with a diameter slightly less than the minimum inner diameter tolerance of the pipe 12, 14 into which the sleeve 16 is to be inserted. This ensures that the sleeve 16 may be inserted into any pipe end 12, 14 which is within the tolerance range for the specific pipe size. It should be appreciated that multiple sizes of sleeves 16, corresponding to the numerous available nominal pipe diameters, may be provided to cover the available ranges of pipe sizes which are connected by welding. The inner circumferential surface 42 of the sleeve has a diameter sized to allow an inspection pig, or other such pipe cleaning or flow volume separating mechanism, to pass therethrough. The ends 20, 22 of the sleeve 16 preferably include a tapered inner surface 36, extending from the ends 20, 22 of the sleeve 16 to a position interiorly of the sleeve ends 20, 22. The tapered inner surface 36 is provided to help prevent a pig or other device from engaging the end of the sleeve 16 and dislodging it, and to increase the flowability of gases and fluids through pipe.

The outer surface 40 of the sleeve 16 includes a central recessed area 44 located at the approximate longitudinal center of the sleeve 16, and a pair of seal grooves, 46, 48 extending circumferentially about the sleeve 16 on either side of the recessed area 44. The grooves 46, are located equidistant either side of the recessed area 44 and have a first depth to accommodate a first seal 50 such as an o-ring therein. The first seal 50 is preferably a high temperature seal configured from a high temperature material, such as silicone, capable of withstanding a temperature of approximately 300 degrees fahrenheit. The second groove 48 is positioned between the first groove 46 and the adjacent end 20 or 22 of the pipe, and is sized at a second depth, greater than that of the first groove 46, to receive a second seal 52 such as an o-ring therein. The second seal 52 may be a buna material capable of withstanding temperatures on the order of 150 degrees fahrenheit. The seals 50, 52 preferably have the same cross section, and therefore the first seal 50 will extend further from the outer surface 40 of the sleeve 16 than will the second seal 52 prior to insertion of the sleeve 16 into the pipe end 12 or 14. If the sleeve 16 will be exposed to high pressures within the pipe, backup rings may be provided in the grooves 46, 48. These rings are preferably configured from a high temperature conformable material such as Viton. The grooves 46, 48 are spaced a sufficient distance from the weld to ensure that the temperatures at the seals 50, 52 disposed therein do not exceed the limit temperatures of the seal material therein. It has been found that if the first grooves 46 are located approximately one inch from the center of the weld and the second grooves 48 are disposed approximately two inches from the center of the weld, the seals 50, 52 will not experience temperatures exceeding the above described limits when the pipe ends 12, 14 are welded together. By providing different groove depths for grooves 46, 48, and placing o-ring seals 50, 52 therein of the same cross-section, the outer circumferences of the seals 50, 52 will span the API tolerance gap of the diameters of pipe ends 12, 14. Therefore, if the pipe end 12 is at the minimum diameter tolerance, and pipe end 14 is at the maximum diameter tolerance, then both of the seals 50, 52 on the portion of the sleeve 16 received in the pipe end 12 will seal against the inner surface of the pipe end 12, but only the seal 50 on the portion of the sleeve 16 received in pipe end 14 will seal against the inner surface thereof. However, sealing engagement of one seal to the inner pipe surface on either side of the weld is sufficient to ensure that a seal is made to prevent entry of pipe fluids and gases to the area of the weld.

In addition to sealing the weld area of the connection 10, the sleeve 16 is configured to provide a heat shield to limit the passage of heat from the weld and into the inner diameter of the sleeve 16. To limit the heat transfer from the weld, the recessed area 44 includes a heat shielding member 54 received therein. The heat shielding member is preferably a high temperature, high purity material, such as a ceramic tape or ceramic paper having a melting point of approximately 3200 degrees F. The heat shielding member 54 protects the sleeve 16 from direct burning by the weld and insulates the sleeve 16 from the heat generated by the weld. A ring member 28 is also received in the recess 44, over the heat shielding member 54. The ring member 28 is preferably a metallic ring, which supports the spacers 30 which are used to align the pipe ends 12, 14 for welding and to properly position the sleeve 16 in the pipe ends 12, 14. However, this ring 28 also tends to transfer heat from the weld area. To limit the heat transfer from the ring member 28 into the body of the sleeve 16, the width of the ring member is preferably slightly smaller than the width of the recess 44, and the insulative material preferably extends between the base and sides of the ring member 28 and the base and sides of the recess 44. By isolating the ring member from direct contact with the mass of the sleeve 16, the amount of heat transferred from the weld to the sleeve 16 is reduced. This reduces the potential peak temperature experienced at the inner circumferential 42 of the sleeve 16 to a level below that which would detrimentally affect the ability of the material exposed at the inner circumferential surface 42 of the sleeve 16 to resist corrosion and/or erosion.

To further limit heat transfer from the weld, the sleeve 16 is preferably a monolithic, i.e. homogeneous one piece member preferably formed from a thermally insulative material such as PTFE filled with fiberglass, or with a composition of 20% carbon and 5% graphite available, or with a mineral oil based material approved by the FDA such as Wollastimite, all of which are available from EGC, Corp. of Houston Tex., or such other material having high heat stability, high abrasion resistance, low reactivity and low thermal creep. A sleeve 16 made from a PTFE or similar base material will limit the heat transfer from the weld along the sleeve outer surface, and through the sleeve 16, by an amount sufficient to protect the seals 50, 52 and the inner circumferential surface 42 of the sleeve 16 from excessive temperatures. Additionally, such a sleeve 16 material is as impervious to the fluids and gasses passing through the welded connection as the internal lining of the pipe. Therefore, the sleeve 16 does not need to be separately coated as in the prior art. Although the preferred sleeve 16 configuration is a one piece homogeneous member, many of the advantageous of the connection 10 construction may be used in conjunction with a metallic, coated, sleeve 16.

Referring now to FIGS. 2 and 4, the ring member 28 is a preferably a loop of material, formed substantially into a ring prior to being placed onto the sleeve 16. Preferably, the loop is formed from the same material as the pipe material, such as an alloy steel. The loop includes a gap 60 formed between the opposed ends 62 of the loop. When the loop is located over the sleeve 16, the opposed ends 62 are preferably tack welded together to secure the ring member 28 in the recessed area 44. Alternatively, the ring 28 may be provided with a gap which allows the ring 28 to spring out and into contact with the inner diameter of the pipe. Thus, when the pipe ends 12, 14 are welded together, the ring 28 will become welded to the inside of the pipe ends 12, 14. When the ring member 28 is formed over the sleeve 16 by tack welding the ends 62 together, the ring member 28 becomes locked into position in the recess 44. Thus, once the ring member 28 is welded in place within the pipe ends 12, 14, the sleeve 16 is then locked in place in the pipe ends 12, 14.

Referring now to FIG. 5, an alternative embodiment of the sleeve 100 is shown. In this embodiment, the sleeve 100 is configured to be received into pipe segments 102, 104 with cement linings 106, or another relatively thick lining. The sleeve 100 is identical to the configuration of sleeve 16, except as specifically noted herein. The cement lining 106 is supplied from the pipe supplier, and is set back a specific distance from the ends 110, 112 of the pipe segments 102, 104. The setback distance corresponds to the distance which the sleeve 100 extends inwardly into the pipe ends 110, 112, such that a gap will be formed between the ends 110, 112 when the sleeve 100 is fully received in the pipe ends 110, 112 corresponding to the gap necessary for a proper weld. To ensure that the weld is not exposed to the pipe fluids or gases, seal rings 114 are located between the ends of the sleeve 100 and the ends of the cement lining 106 within the pipe ends 102, 104.

When combined with cement coated pipe, the sleeve 100 of the present invention does not require the spacers 30, because the cement lining 106 within the pipe 102, 104, in cooperation with the sleeve 100, establishes the required gap between the pipe ends 110, 112 for welding. Additionally, the ring member 28 need not be used, because the ends of the cement lining maintain the sleeve 100 in position in the longitudinal direction of the pipe 102, 104. However, the recessed area 44, and an insulative member therein, are necessary to limit direct heat transfer from the weld into the sleeve 100. Therefore, ceramic, or other insulative member 54 is received in recessed area 44 to protect the sleeve 100 from direct burning from the weld and to insulate the sleeve 100 from the heat generated from the weld. The member 54 may be configured as a wrap or wraps of silica cloth, which is placed within the recessed area 44, or the material may be adhered to the sides of the recessed area 44, and formed to leave an air gap 122 between the insulative member 54 and the weld. Alternatively, the ring member 28 and the spacers 30 may be used with a cement lined pipe, but so long as the cement lining terminates within the pipe 102, 104 at a proper distance to properly align the sleeve 100 in the pipe 102, 104, the ring member 28 and the spacers 30 are redundant.

To prepare a pipe joint using the cylindrical corrosion barrier 10 of the present invention, the sleeve 16 is first prepared by compressing the split ring member 28 into the recessed area 44 over the insulative member 54, and the ends 62 of the ring 28 are tack welded together. This may be performed on site, or the ring member 28 may be tack welded in place when the sleeve is manufactured, or at intermediate steps in between. The sleeve 16, with the seals 50, 52, the insulative member 54, and the ring member 28 thereon, is loaded into the first pipe end 12 until the spacers 30 are in contact with, or immediately adjacent, the pipe end 12. Then, the second pipe end 14 is manipulated over the sleeve until the pipe end contacts the spacers 30. At this point, the pipe ends 12, 14 are tack welded together at multiple discrete locations between the spacers 30 without incorporating the spacers 30 into the weld. For example, if three pins are used, three tack welds are located to connect the pipe ends 12, 14 midway between the three spacers 30. The spacers 30 are then removed, preferably by hitting the portion thereof extending outwardly beyond the pipe ends 12, 14 with a hammer. Then the weld is completed in multiple passes. During welding, a small gap is maintained to allow air to vent from the area between the sleeve 16 and the pipe ends 12, 14, and the gap is closed at the end of the welding process. If the sleeve 100 is used in conjunction with a cement lined pipe, the ring member 28 and the spacers 30 need not be used if the lining is properly terminated inwardly the pipe end to properly position the sleeve.

The sleeves 16 and 100 provided herein provide a continuous corrosion barrier at the weld joint joining adjacent pipe ends 12, 14 or pipe ends 110, 112. In one embodiment of the invention, the sleeves 16, 100 are integrally non-corrosive, and therefore need not be separately coated with a protective barrier to prevent corrosion or erosion thereof. Additionally, the sleeves 16, 100 may be used without the risk of affecting the weld by the sacrificing of alignment boss material into the weld. Further, the portion of the protective coating on the inside of the pipe ends 12, 14 which is burned or otherwise modified by the heat of welding to the point where it loses its protectiveness is limited to the areas protected by the seals 50, 52, and the inner diameter of the sleeve 16, 100 is not adversely affected by the weld heat where a solid insulative sleeve 16, 100 is provided. Further, because the edges of the ring member 28 are isolated from the sleeve 16 by the insulative member 54, the quantity of the weld heat which actually transfers to the inner diameter of the sleeve is reduced. Therefore, if the sleeve 16 is a coated metallic member, the inner coating of the sleeve 16 is far less likely to be affected by the weld heat. Where the sleeves 16, 100 are configured as solid insulative members, such as PTFE, the sleeve 16, 100 may be used without deleterious effect even if the sleeve is cut or nicked, because no base metallic material can be exposed as would occur with the prior art coated metallic sleeves. Further, where the sleeve 16, 100 is non-metallic, a magnetic inspection pig may more easily inspect the pipe and weld area, because no secondary metallic barrier extends over the weld. Finally, the multiple seal arrangement ensures that the sleeves 16, 100, will protect the weld area irrespective of the size of the pipe within each pipe size tolerance.

Although the preferred embodiments of the invention have been described embodying multiple features of the invention, each of the individual features of the invention may be used separately, or concurrently, to provide improvements in the connection of pipe ends 12, 14. For example, the ring member 28 may be configured of non-metallic members, or the spacers 30 may extend through the ring member 28, and be semi-permanently affixed to the sleeve. The ring may also be formed from a material having low thermal conductivity which, when coupled against a ferrous material such as the pipe, does not create a galvanic reaction but is attachable to the weld. In such circumstance, the ting member 28 may be embedded in the sleeve 16, or integrally formed therein.

We claim:

1. A continuous corrosion barrier for welded interconnections of pipe ends, comprising:

a sleeve having a cylindrical outer surface, a cylindrical inner surface and opposed first and second ends;

a first seal disposed on said outer surface intermediate the center of said opposed first and second ends and said first end;

a second seal disposed on said outer surface intermediate said first seal groove and said first end; and said first seal extending a first height from said outer cylindrical surface and said second seal extending a second height from said outer cylindrical surface, said first height exceeding said second height.

2. The continuous corrosion barrier of claim 1, further including a recess located adjacent the longitudinal center thereof.

3. The continuous corrosion barrier of claim 2, wherein said recess includes a plurality of removable spacers extending therefrom.

4. The continuous corrosion barrier of claim 3, wherein said spacers are received on a ring, and said is received in said recess.

5. The continuous barrier of claim 4, wherein said ring is welded to the pipe ends.

6. The continuous corrosion barrier of claim 1, wherein said first seal is configured from a high temperature conformable material.

7. The continuous corrosion barrier of claim 6, wherein said second seal is configured from a material having a lower temperature resistance than the material of said first seal.

8. The continuous corrosion barrier of claim 1, wherein said sleeve is configured from a non-metallic material.

9. The continuous corrosion barrier of claim 8, wherein said non-metallic material includes PTFE therein.

10. The continuous barrier of claim 9, wherein said non-metallic material includes fiberglass therein.

11. The continuous corrosion barrier of claim 6 wherein said non-metallic material includes carbon and graphite therein.

12. An apparatus for providing a continuous corrosive barrier at a welded connection of pipe having an internal corrosion resistant barrier therein, comprising:

a heat and corrosion resistant monolithic sleeve member comprising inner and outer cylindrical surfaces, opposed ends received within the pipe adjacent the weld connection, and a circumferential recess disposed intermediate the opposed ends and aligned with the weld connection;

a circumferential metal ring member disposed within the recess, the ring having an outer diameter slightly less than the inner diameter of the pipe and an inner diameter sufficiently less than the outer diameter of the recess so that the sleeve is secured relative to the ring;

an insulative member disposed between the ring and the sleeve.

13. The apparatus of claim 12, wherein said sleeve is configured from PTFE.

14. The apparatus of claim 13, wherein said PTFE includes fiberglass therein.

15. The apparatus of claim 13, wherein said PTFE includes carbon and graphite therein.

16. The apparatus of claim 12, wherein said sleeve further includes;

a first pair of seal members therein, one of each of said first pair of seal members extending about the outer circumference of said sleeve adjacent either side of a position midway between said opposed ends of said sleeve; and a second pair of seal members extending about the outer circumference of said sleeve, each of said second seal members disposed intermediate said first seal members and said opposed sleeve ends.

17. The apparatus of claim 16, wherein said seal members are received in grooves in said sleeve, and said grooves receiving said first pair of seals are shallower than said grooves receiving said second pair of seals.

18. The apparatus of claim 16, wherein said first pair of seals are silicone seals.

19. The apparatus of claim 12, further including a plurality of removable pins extending from said ring prior to forming the weld connection.

20. The apparatus of claim 12 wherein the weld connection adheres to said ring member.

21. The apparatus of claim 20 wherein the sleeve further comprises:

a first seal disposed on the outer surface intermediate the center of the opposed first and second ends and the first end; and a second seal disposed on the outer surface intermediate the center of the opposed first and second ends and the second end.

22. The apparatus of claim 20 wherein the sleeve further comprises:

a first seal disposed on the outer surface intermediate the center of the opposed first and second ends and the first end;

a second seal disposed on the outer surface intermediate the first seal and the first end;

the first seal extending a first height from the outer cylindrical surface and the second seal extending a second height from the outer cylindrical surface, the first height exceeding the second height.

23. The apparatus of claim 22 wherein the sleeve further comprises:

a third seal disposed on the outer surface intermediate the center of the opposed first and second ends and the second end;

a fourth seal disposed on the outer surface intermediate the third seal and the first end;

the third seal extending a first from the outer cylindrical surface and the fourth seal extending a second height from the outer cylindrical surface, the first height exceeding the second height.

24. The apparatus of claim 23 further comprising a removable pin extending outwardly from the ring.

25. A continuous corrosion barrier for welded interconnections of pipe ends, comprising:

a sleeve having cylindrical outer surface and a cylindrical inner surface and opposed first and second ends;

a plurality of removable pins extending outwardly from said sleeve, adjacent the midpoint between said opposed first and second ends; wherein said sleeve further includes a recess formed therein adjacent said midpoint, and wherein said pins are received on a support member received in said recess.

26. The continuous barrier of claim 25, wherein said sleeve is constructed of a non-metallic member.

27. The continuous corrosion barrier of claim 26, wherein said non-metallic material is PTFE.

28. The continuous corrosion barrier of claim 25, wherein said cylindrical outer surface of said sleeve includes a plurality of seals disposed between said midpoint and each of said first and second ends.

* * * * *